United States Patent
Yamaguchi et al.

(10) Patent No.: US 6,950,742 B2
(45) Date of Patent: Sep. 27, 2005

(54) FAILURE DIAGNOSIS APPARATUS FOR EVAPORATIVE FUEL PROCESSING SYSTEM

(75) Inventors: Takashi Yamaguchi, Wako (JP); Satoru Kubo, Wako (JP); Mahito Shikama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/798,850

(22) Filed: Mar. 12, 2004

(65) Prior Publication Data
US 2004/0226353 A1 Nov. 18, 2004

(30) Foreign Application Priority Data

Mar. 14, 2003 (JP) ........................................ 2003-069953
Jan. 16, 2004 (JP) ........................................ 2004-008998

(51) Int. Cl.[7] ............................................. F02M 25/08
(52) U.S. Cl. ....................... 701/114; 73/118.1; 123/520
(58) Field of Search ................................. 701/114, 115, 701/102; 123/520, 519, 521; 73/117.3, 118.1

(56) References Cited

U.S. PATENT DOCUMENTS 6,830,040 B1 * 12/2004 Toyoda ........................ 123/520

2004/0173011 A1 * 9/2004 Nakoji ........................ 73/118.1

FOREIGN PATENT DOCUMENTS

JP 2002-357164 12/2002

* cited by examiner

*Primary Examiner*—Hieu T. Vo
(74) *Attorney, Agent, or Firm*—Arent Fox PLLC

(57) ABSTRACT

A failure diagnosis apparatus for diagnosing a failure of an evaporative fuel processing system. The system includes a fuel tank, a canister having adsorbent for adsorbing evaporative fuel generated in the fuel tank, an air passage connected to the canister and communicating the canister with the atmosphere, a first passage for connecting the canister and the fuel tank, a second passage for connecting the canister and an intake system of an internal combustion engine, a vent shut valve for opening and closing the air passage, and a purge control valve provided in the second passage. A pressure in the evaporative fuel processing system is detected. Negative pressure in the intake system is reserved in a negative pressure reservoir during operation of the engine. The purge control valve and the vent shut valve are closed to introduce the reserved negative pressure into the evaporative fuel processing system, when stoppage of the engine is detected. It is determined whether or not there is a leak in the evaporative fuel processing system, based on the pressure detected during a predetermined determination period after introduction of the negative pressure.

15 Claims, 15 Drawing Sheets

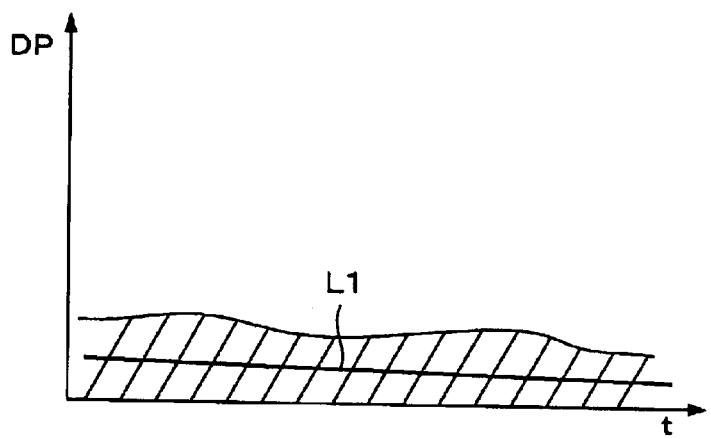
*FIG. 10A*
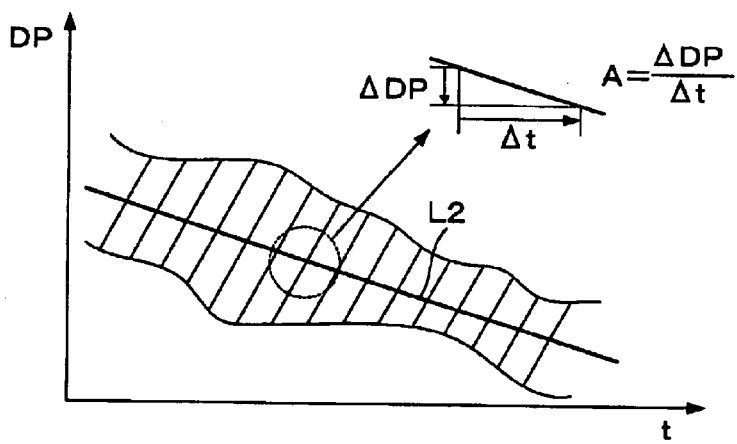
*FIG. 10B*
*FIG. 11*
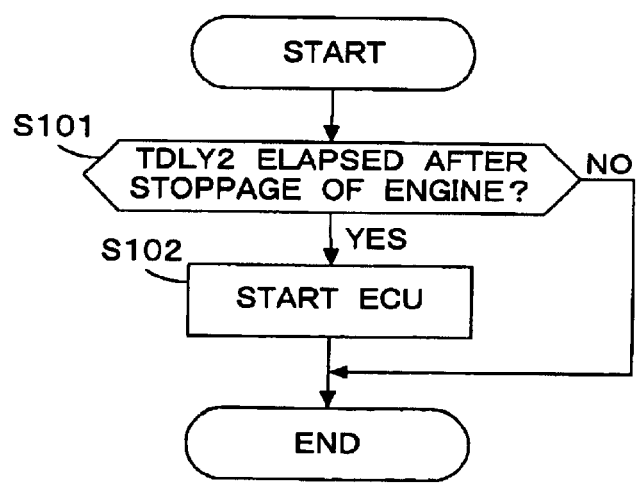

FAILURE DIAGNOSIS APPARATUS FOR EVAPORATIVE FUEL PROCESSING SYSTEM

BACKGROUND OF THE INVENTION

1. Field of the Invention

This invention relates to a failure diagnosis apparatus for diagnosing a failure of an evaporative fuel processing system which temporarily stores evaporative fuel generated in a fuel tank and supplies the stored evaporative fuel to an internal combustion engine.

2. Description of the Related Art

A failure diagnosis apparatus for determining whether or not there is a leak in an evaporative fuel processing system after stoppage of an internal combustion engine is disclosed, for example, in Japanese Patent Laid-Open No. 2002-357164. According to this apparatus, air is pressurized by a motor pump and introduced into the evaporative fuel processing system. The determination of whether there is a leak is performed based on a load current value of the motor pump upon air-pressurization. Specifically, if there is a leak in the evaporative fuel processing system, the load current value of the motor pump decreases. Therefore, it is determined that there is a leak when the load current value during air-pressurization is lower than a predetermined determination threshold value.

The conventional apparatus described above requires a motor pump for air-pressurization and raises a problem that the configuration of the apparatus becomes complicated, thereby increasing manufacturing cost. The conventional apparatus further raises a problem that, if there is a leak, evaporative fuel in the evaporative fuel processing system is emitted into the atmosphere by the air-pressurization.

SUMMARY OF THE INVENTION

It is an object of the present invention to provide a failure diagnosis apparatus which can rapidly perform leak determination of an evaporative fuel processing system with a comparatively simple configuration after stoppage of the internal combustion engine.

One aspect of the present invention provides a failure diagnosis apparatus for diagnosing a failure of an evaporative fuel processing system (50). The evaporative fuel processing system (50) includes a fuel tank (9), a canister (33) having adsorbent for adsorbing evaporative fuel generated in the fuel tank (9), an air passage (37) connected to the canister (33) and communicating the canister (33) with the atmosphere, a first passage (31) for connecting the canister (33) and the fuel tank (9), a second passage (32) for connecting the canister (33) and an intake system (2) of an internal combustion engine (1), a vent shut valve (38) for opening and closing the air passage (37), and a purge control valve (34) provided in the second passage (32). The failure diagnosis apparatus includes pressure detecting means (15), negative pressure reserving means (41), engine stoppage detecting means, negative pressure introducing means, and determining means. The pressure detecting means detects a pressure (PTANK) in the evaporative fuel processing system (50). The negative pressure reserving means (41) reserves negative pressure in the intake system (2) during operation of the engine (1). The engine stoppage detecting means detects stoppage of the engine (1). The negative pressure introducing means closes the purge control valve (34) and the vent shut valve (38) to introduce the negative pressure reserved in the negative pressure reserving means (41) into the evaporative fuel processing system (50), when stoppage of the engine (1) is detected by the engine stoppage detecting means. The determining means determines whether or not there is a leak in the evaporative fuel processing system (50), based on the pressure (PTANK) detected by the pressure detecting means (15) during a predetermined determination period after the negative pressure is introduced into the evaporative fuel processing system (50).

The "negative pressure" means a pressure which is lower than the atmospheric pressure.

With this configuration, during operation of the engine, the negative pressure in the intake system is reserved by the negative pressure reserving means, and the reserved negative pressure is introduced into the evaporative fuel processing system after stoppage of the engine. Then, it is determined whether or not there is a leak, based on a detected pressure in the evaporative fuel processing system during a predetermined determination period after introduction of the negative pressure. Accordingly, it is not necessary to use a motor pump for pressurization, as in the conventional apparatus. Further, since the pressure in the evaporative fuel processing system becomes lower than the atmospheric pressure, the evaporative fuel can be prevented from being emitted to the atmosphere. Furthermore, the determination can be performed more rapidly compared with another determination method wherein the determination is performed without using the negative pressure reserving means.

Preferably, the determining means determines that there is a leak in the evaporative fuel processing system (50), when an amount (PTLK1–PTLK0) of change in the pressure (PTANK) detected by the pressure detecting means (15) during the predetermined determination period, is greater than a determination threshold value ($\Delta$PTH).

Preferably, the failure diagnosis apparatus further includes fuel amount detecting means (16) for detecting a remaining fuel amount (FLEVEL) in the fuel tank (9). The determination threshold value ($\Delta$PTH) is set according to the remaining fuel amount (FLEVEL) detected by the fuel amount detecting means (16).

Preferably, the determination means calculates a change rate parameter (DP) indicative of a rate of change in the pressure (PTANK) detected by the pressure detecting means (15) during the predetermined determination period, and performs the determination based on a rate (A) of change in the change rate parameter (DP).

Preferably, the determination means statistically processes detected values of the change rate parameter (DP) and detection timings (TMU) of the detected values of the change rate parameter (DP), to calculate an inclination (A) of a regression line indicative of a relation between the detected values of the change rate parameter (DP) and the detection timings (TMU) thereof, and performs the determination based on the calculated inclination (A).

BRIEF DESCRIPTION OF THE DRAWINGS

FIGS. 10A and 10B are graphs illustrating a determination method in a second embodiment of the present invention;

FIG. 11 is a flow chart illustrating a timer operation for measuring a time period after stoppage of the engine;

DETAILED DESCRIPTION OF THE PREFERRED EMBODIMENTS

Preferred embodiments of the present invention will now be described with reference to the drawings.

First Embodiment

Figure 1:
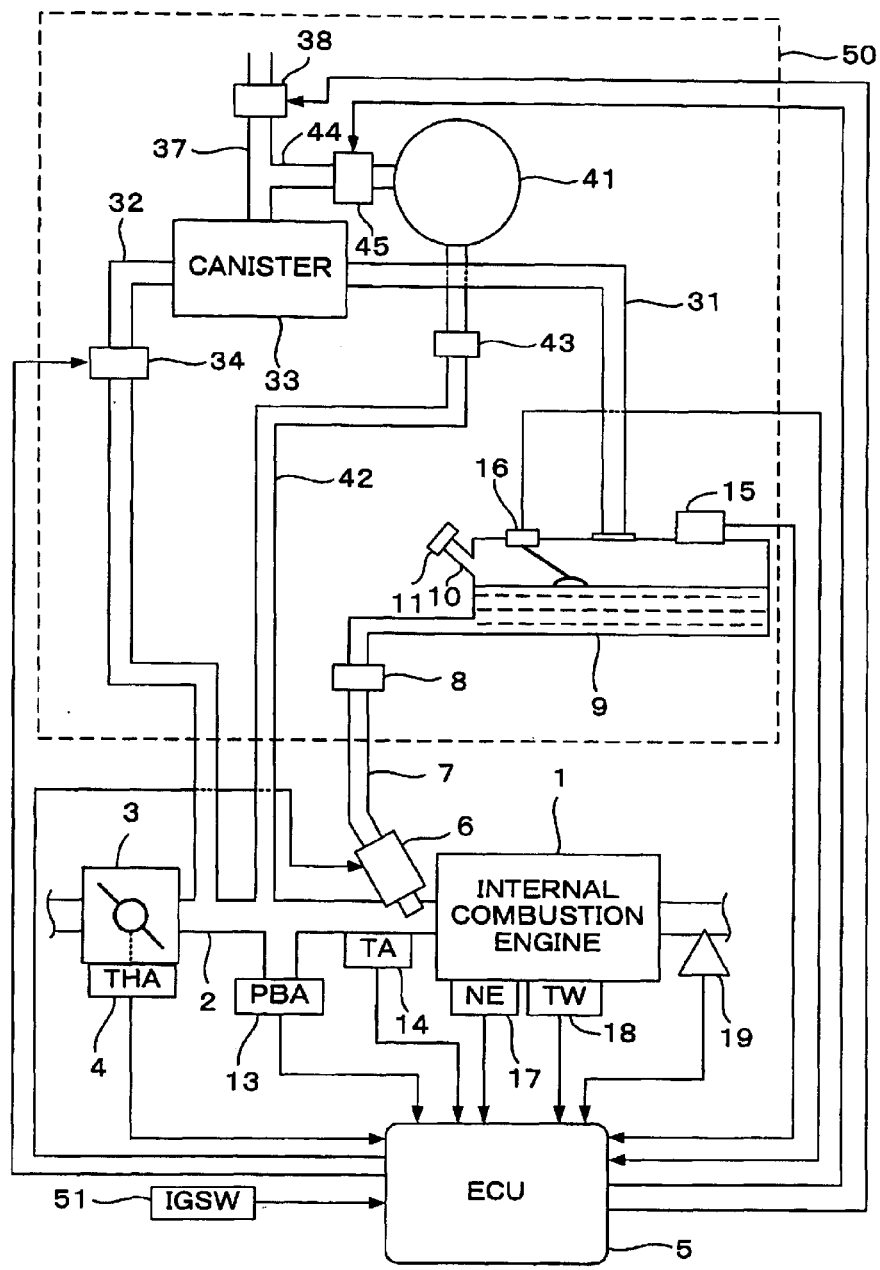
FIG. 1 is a schematic diagram of an evaporative fuel processing system and a control system of an internal combustion engine according to an embodiment of the present invention.

FIG. 1 is a schematic diagram of an evaporative fuel processing system and a control system of an internal combustion engine according to a first embodiment of the present invention. Referring to FIG. 1, an internal combustion engine (hereinafter referred to as "engine") 1 having, for example, four cylinders has an intake pipe 2 provided with a throttle valve 3. A throttle valve opening (THA) sensor 4 is connected to the throttle valve 3 and supplies an electric signal corresponding to an opening of the throttle valve 3 to an electronic control unit (hereinafter referred to as ECU) 5.

A portion of the intake pipe 2 between the engine 1 and the throttle valve 3 is provided with a plurality of fuel injection valves 6, respectively corresponding to the plural cylinders of the engine 1 at positions slightly upstream of the respective intake valves (not shown). Each fuel injection valve 6 is connected through a fuel supply pipe 7 to a fuel tank 9. The fuel supply pipe 7 is provided with a fuel pump 8. The fuel tank 9 has a fuel filler neck 10 for use in refueling with a filler cap 11 mounted on the fuel filler neck 10.

Each fuel injection valve 6 is electrically connected to the ECU 5 and has a valve opening period controlled by a signal from the ECU 5. The intake pipe 2 is provided with an absolute intake pressure (PBA) sensor 13 and an intake air temperature (TA) sensor 14 at positions downstream of the throttle valve 3. The absolute intake pressure sensor 13 detects an absolute intake pressure PBA in the intake pipe 2. The intake air temperature sensor 14 detects an air temperature TA in the intake pipe 2.

An engine rotational speed (NE) sensor 17 for detecting an engine rotational speed is disposed near the outer periphery of a camshaft or a crankshaft (both not shown) of the engine 1. The engine rotational speed sensor 17 outputs a pulse (TDC signal pulse) at a predetermined crank angle per 180 degree rotation of the crankshaft of the engine 1. There is also provided an engine coolant temperature sensor 18 for detecting a coolant temperature TW of the engine 1 and an oxygen concentration sensor (which will hereinafter be referred to as "LAF sensor") 19 for detecting an oxygen concentration in exhaust gases from the engine 1. Detection signals from the sensors 13, 14, and 17 to 19 are supplied to the ECU 5. The LAF sensor 19 functions as a wide-region air-fuel ratio sensor which outputs a signal substantially proportional to an oxygen concentration in exhaust gases (proportional to an air-fuel ratio of air-fuel mixture supplied to the engine 1).

An ignition switch (IGSW) 51 is connected to the ECU 5, and a switching signal of the ignition switch 51 is supplied to the ECU 5.

The fuel tank 9 is connected to a canister 33 through a charge passage 31. The canister 33 is connected through a purge passage 32 to the intake pipe 2 at a portion downstream of the throttle valve 3.

The fuel tank 9 is provided with a pressure sensor 15 for detecting a pressure in the fuel tank, and a fuel level sensor 16 for detecting a fuel level (a remaining fuel amount). Detection signals of these sensors are supplied to the ECU 5. A pressure PTANK detected by the pressure sensor 15 will be hereinafter referred to as "tank pressure PTANK".

The canister 33 contains active carbon for adsorbing evaporative fuel generated in the fuel tank 9. An air passage 37 is connected to the canister 33. The canister 33 communicates with the atmosphere through the air passage 37.

The air passage 37 is provided with a vent shut valve (on-off valve) 38. The vent shut valve 38 is a solenoid valve, and the operation is controlled by the ECU 5 in such a manner that the vent shut valve 38 is opened upon refueling or when the evaporative fuel adsorbed in the canister 33 is purged to the intake pipe 2. Further, the vent shut valve 38 is opened and closed during execution of a failure diagnosis hereinafter described. The vent shut valve 38 is a normally open solenoid valve which remains open when no driving signal is supplied thereto.

The intake pipe 2 is connected through a first negative pressure passage 42 to a negative pressure reservoir 41. The first negative pressure passage 42 is provided with a check valve 43. The check valve 43 opens when the absolute intake pressure PBA becomes lower than a pressure PVR in the negative pressure reservoir 41. The negative pressure reservoir 41 is connected through a second negative pressure passage 44 to the air passage 37. The negative pressure reservoir 41 has a capacity of, for example, approximately 4 liters. The pressure PVR in the negative pressure reservoir 41 decreases to approximately 21 kPa (160 mmHg) after running of the vehicle driven by the engine 1.

The second negative pressure passage 44 is provided with a negative pressure control valve 45. The negative pressure control valve 45 is a solenoid valve and its operation is controlled by the ECU 5. The negative pressure control valve 45 is opened and closed during execution of a failure diagnosis hereinafter described. The negative pressure control valve 45 is a normally closed solenoid valve which remains closed when no driving signal is supplied thereto.

The purge passage 32 is provided with a purge control valve 34. The purge control valve 34 is a solenoid valve capable of continuously controlling the flow rate by changing the on-off duty ratio of the control signal (by changing the opening degree of the purge control valve). The operation of the purge control valve 34 is controlled by the ECU 5.

The fuel tank 9, the charge passage 31, the canister 33, the purge passage 32, the purge control valve 34, the air passage 37 and the vent shut valve 38 constitute an evaporative fuel processing system 50. After the engine 1 stops, the negative pressure reserved in the negative pressure reservoir 41 is introduced into the evaporative fuel processing system 50, and a failure diagnosis is performed.

In the present embodiment, even after the ignition switch 51 is turned off, the ECU 5, vent shut valve 38 and negative pressure control valve 45 are kept powered during the execution period of the failure diagnosis hereinafter described. The purge control valve 34 is powered off to maintain closed condition, when the ignition switch 51 is turned off.

If a large amount of evaporative fuel is generated upon refueling of the fuel tank 9, then the generated evaporative fuel is stored in the canister 33. In a predetermined operating condition of the engine 1, the duty control of the purge control valve 34 is performed to supply a suitable amount of evaporative fuel from the canister 33 to the intake pipe 2.

The ECU 5 is provided with an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (which will hereinafter be referred to as "CPU"), a memory circuit, and an output circuit. The memory circuit preliminarily stores various operational programs to be executed by the CPU and the results of computation or the like by the CPU. The output circuit supplies drive signals to the fuel injection valves 6, the purge control valve 34, the vent shut valve 38, and the negative pressure control valve 45.

For example, the CPU in the ECU 5 controls an amount of fuel to be supplied to the engine 1 and a duty ratio of the control signal supplied to the purge control valve 34 according to output signals from the various sensors including the engine rotational speed sensor 17, the absolute intake pressure sensor 13, and the engine coolant temperature sensor 18. Further, the CPU in the ECU 5 executes a failure diagnosis process of the evaporative fuel processing system 50 hereinafter described.

Figure 2:
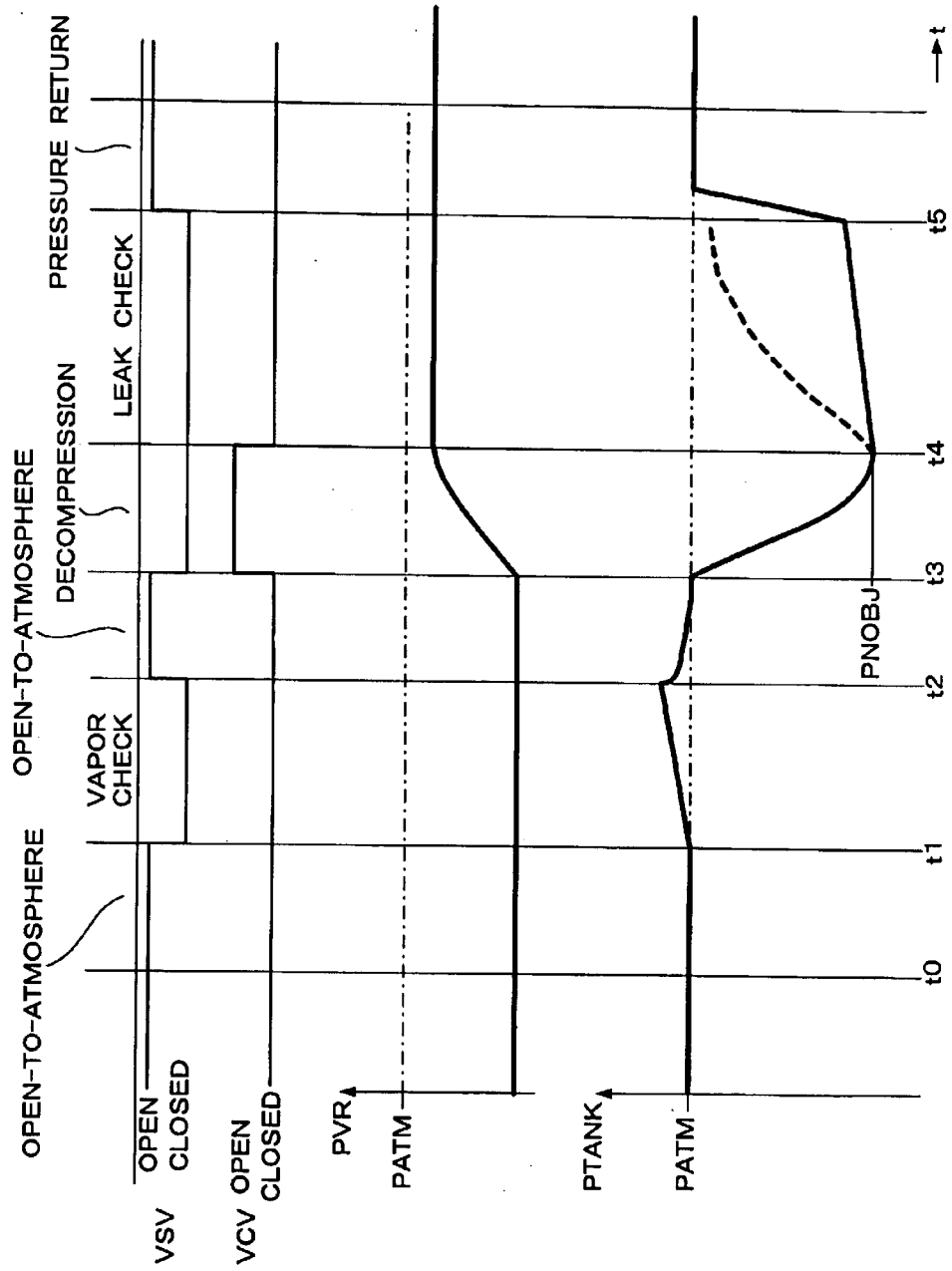
FIG. 2 is a time chart illustrating an outline of a failure diagnosis.

FIG. 2 is a time chart illustrating an outline of the failure diagnosis of the evaporative fuel processing system 50 executed after stoppage of the engine 1.

After the ignition switch is turned off and the engine 1 stops, the purge control valve 34 is closed while the vent shut valve 38 (indicated as "VSV" in FIG. 2) remains open. Consequently, the evaporative fuel processing system 50 is placed into a condition where it is open to the atmosphere (hereinafter referred to as "open-to-atmosphere condition"). It is to be noted that a first open-to-atmosphere mode process hereinafter described is started at time t0 after a predetermined time period TDLY1 has elapsed from the time of engine stoppage. Actually, however, since the vent shut valve 38 remains open prior to time t0, the evaporative fuel processing system 50 is already in the open-to-atmosphere condition.

A vapor check mode process is started at time t1, and the vent shut valve 38 is closed. This brings the evaporative fuel processing system 50 to a blocked condition. Therefore, the tank pressure PTANK rises a little due to the evaporative fuel generated in the fuel tank 9.

At time t2, a second open-to-atmosphere mode process is started and the vent shut valve 38 is opened.

At time t3, a decompression mode process is started, and the vent shut valve 38 is closed while the negative pressure control valve 45 (in FIG. 2, denoted by "VCV") is opened. In the decompression mode process, the negative pressure in the negative pressure reservoir 41 is introduced into the evaporative fuel processing system 50. Consequently, the pressure PVR in the negative pressure reservoir 41 rises while the tank pressure PTANK drops. A target pressure PNOBJ is set to a pressure which is, for example, lower by approximately 2.5 kPa (18.5 mmHg) than the atmospheric pressure PATM.

A leak check mode process is started at time t4, and the negative pressure control valve 45 is closed. In this condition, the tank pressure PTANK is monitored. If the tank pressure PTANK rises as indicated by the broken line, then it is determined that there is a leak. On the other hand, when the rise amount of the tank pressure PTANK is little as indicated by the solid line, it is determined that the evaporative fuel processing system 50 is normal.

At time t5, a pressure return mode process is started, and the vent shut valve 38 is opened. Consequently, the tank pressure PTANK returns to the atmospheric pressure PATM.

Figure 3:
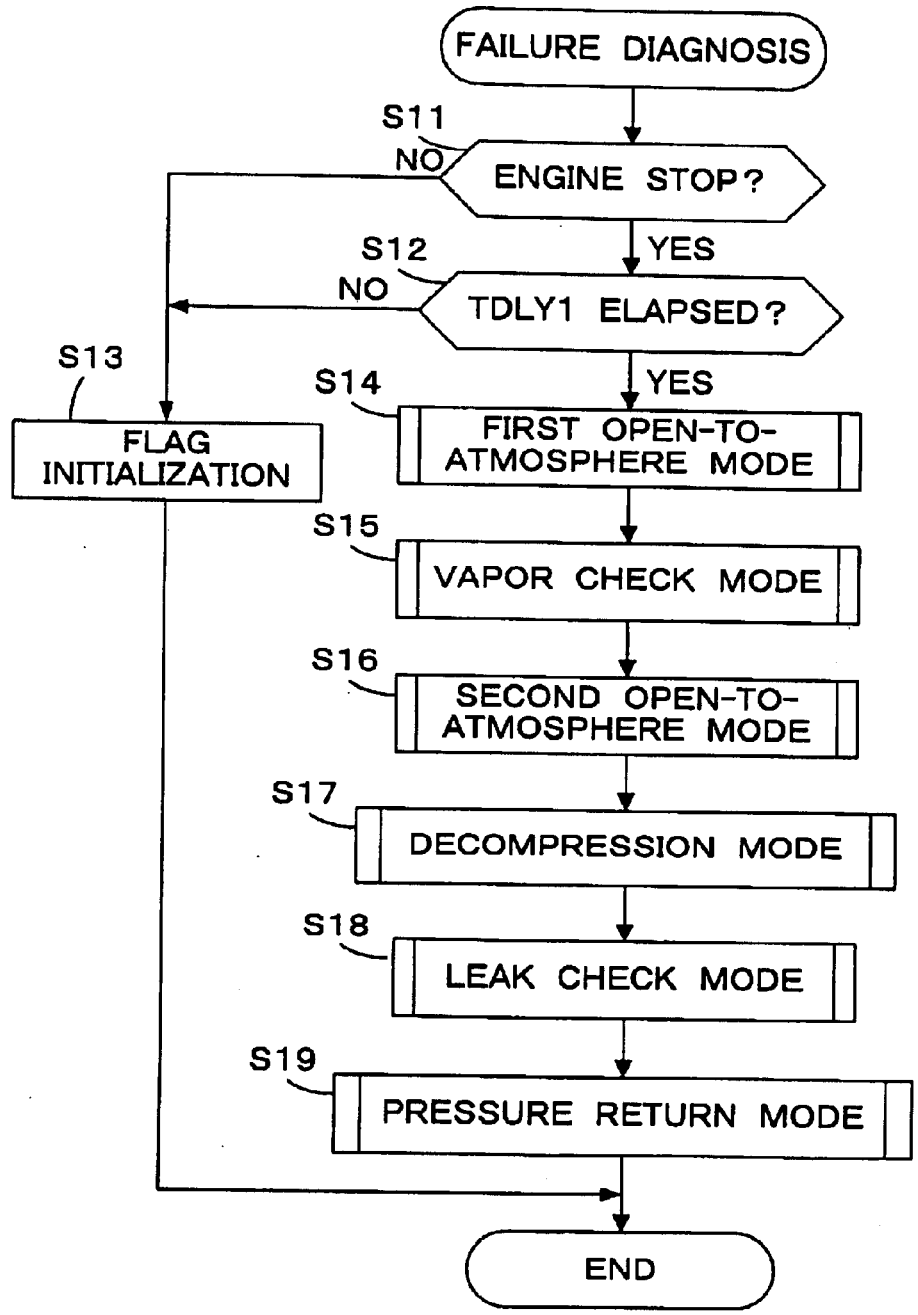
FIG. 3 is a flow chart of a process for performing the failure diagnosis.

FIG. 3 is a flow chart of the failure diagnosis process of the evaporative fuel processing system 50 executed by the CPU in the ECU 5. This process is executed by the CPU in the ECU 5 at predetermined time intervals (for example, 80 milliseconds).

In step S11, it is determined whether or not the engine 1 has stopped, that is, whether or not the ignition switch is turned off. If the engine 1 is operating, then initialization of flags used in the present process is performed (step S13). More specifically, a first open-to-atmosphere flag FATM1 is set to "1", and a vapor check flag FVCHK, a second open-to-atmosphere flag FATM2, a decompression flag FPDEC, a leak check flag FLCHK and a pressure return flag FPR are all set to "0".

After stoppage of the engine 1, it is determined whether or not a predetermined time period TDLY1 (for example, 60 seconds) has elapsed from stoppage of the engine 1 (step S12). Before the predetermined time period TDLY1 has elapsed, the process proceeds to step S13. After the predetermined time period TDLY1 has elapsed, the process proceeds to step S14. Then, a first open-to-atmosphere mode process (step S14), a vapor check mode process (step S15), a second open-to-atmosphere mode process (step S16), a decompression mode process (step S17), a leak check mode process (step S18) and a pressure return mode process (step S19) are executed successively.

Figure 4:
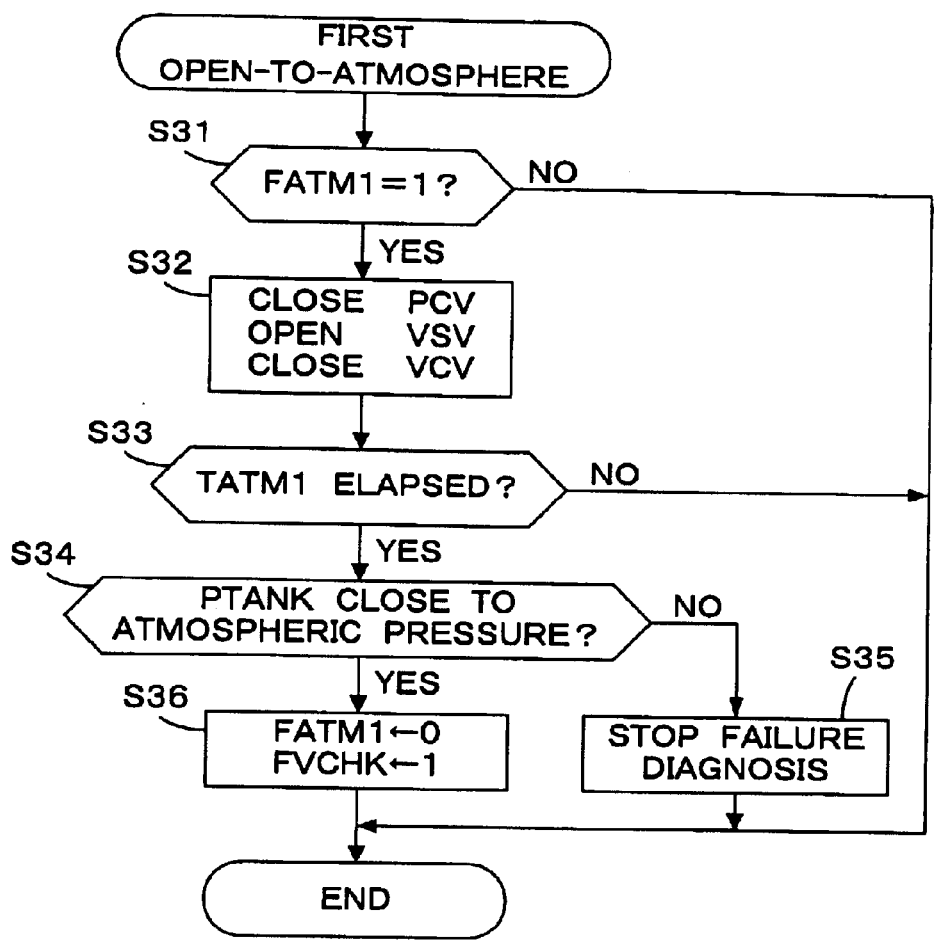
FIG. 4 is a flow chart of a first open-to-atmosphere mode process executed in the process of FIG. 3.

FIG. 4 is a flow chart of the first open-to-atmosphere mode process executed in step S14 of FIG. 3.

In step S31, it is determined whether or not the first open-to-atmosphere flag FATM1 is "1". Since the first open-to-atmosphere flag FATM1 is set to "1" in step S13 of FIG. 3, the process proceeds to step S32. In step S32, the purge control valve (PCV) 34 and the negative pressure control valve (VCV) 45 are maintained in the closed state, and the vent shut valve 38 is maintained in the open state. Then, it is determined whether or not a predetermined time period TATM1 (for example, 90 seconds) has elapsed from the time the first open-to-atmosphere mode process is started (step S33). Before the predetermined time period TATM1 has elapsed, the present process ends immediately. After the predetermined time period TATM1 has elapsed, the process proceeds to step S34, in which it is determined whether or not the tank pressure PTANK is close to the atmospheric pressure PATM (for example, within a range of (PATM±0.7 kPa)). If the answer to step S34 is negative (NO), then it is determined that some abnormality has occurred, and the failure diagnosis process is stopped immediately (step S35).

If the answer to step S34 is affirmative (YES), then the first open-to-atmosphere flag FATM1 is set to "0" and the vapor check flag FVCHK is set to "1" (step S36). As a result, the answer to step S31 becomes negative. Consequently, the first open-to-atmosphere mode process ends.

Figure 5:
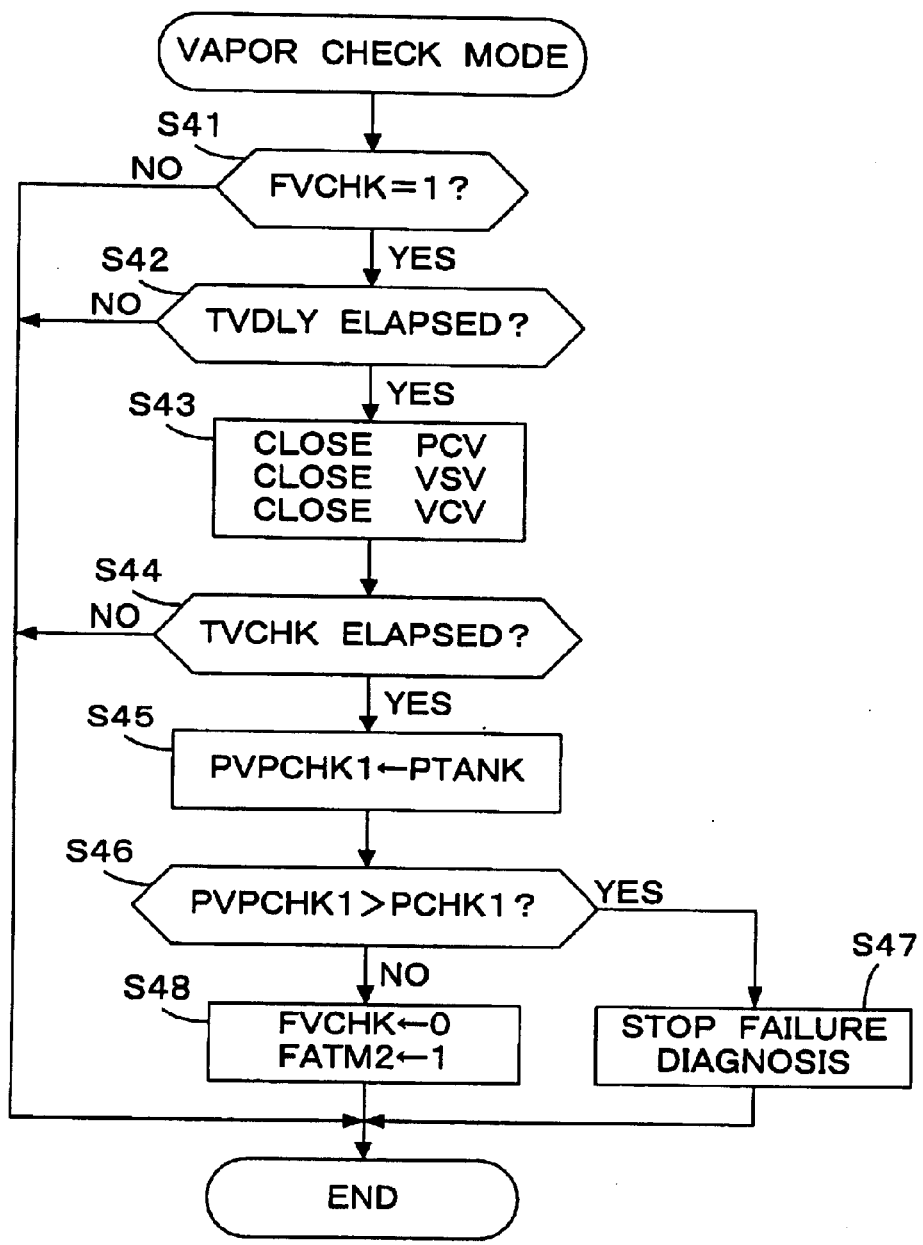
FIG. 5 is a flow chart of a vapor check mode process executed in the process of FIG. 3.

FIG. 5 is a flow chart of the vapor check mode process executed in step S15 of FIG. 3.

In step S41, it is determined whether or not the vapor check flag FVCHK is "1". If FVCHK is equal to "1", then it is determined whether or not predetermined waiting time period TVDLY (for example, 1 second) has elapsed from the time of starting the vapor check mode process (step S42). Before the predetermined waiting time period TVDLY has elapsed, the present process ends immediately. After the predetermined waiting time period TVDLY has elapsed, the process proceeds to step S43, in which the purge control valve 34 and the negative pressure control valve 45 are maintained in the closed state, while the vent shut valve 38 is closed.

In step S44, it is determined whether or not a predetermined time period TVCHK (for example, 120 seconds) has elapsed after the time of closing the vent shut valve 38. Before the predetermined time period TVCHK has elapsed, the present process ends immediately. After the predetermined time period TVCHK has elapsed, a vapor check pressure PVPCHK1 is set to the present tank pressure PTANK (step S45). Then, it is determined whether or not the vapor check pressure PVPCHK1 is higher than a predetermined pressure PCHK1 (for example, 0.7 kPa) (step S46). If the answer to step S46 is affirmative (YES), then it is determined that the generated amount of evaporative fuel is great. In this case, the failure diagnosis is stopped (step S47), since an accurate failure diagnosis cannot be expected If PVPCHK1 is lower than or equal to PCHK1 in step S46, then the vapor check flag FVCHK is set to "0" and the second open-to-atmosphere flag FATM2 is set to "1" (step S48). After execution of step S48, the answer to step S41 becomes negative, and the vapor check mode process ends.

Figure 6:
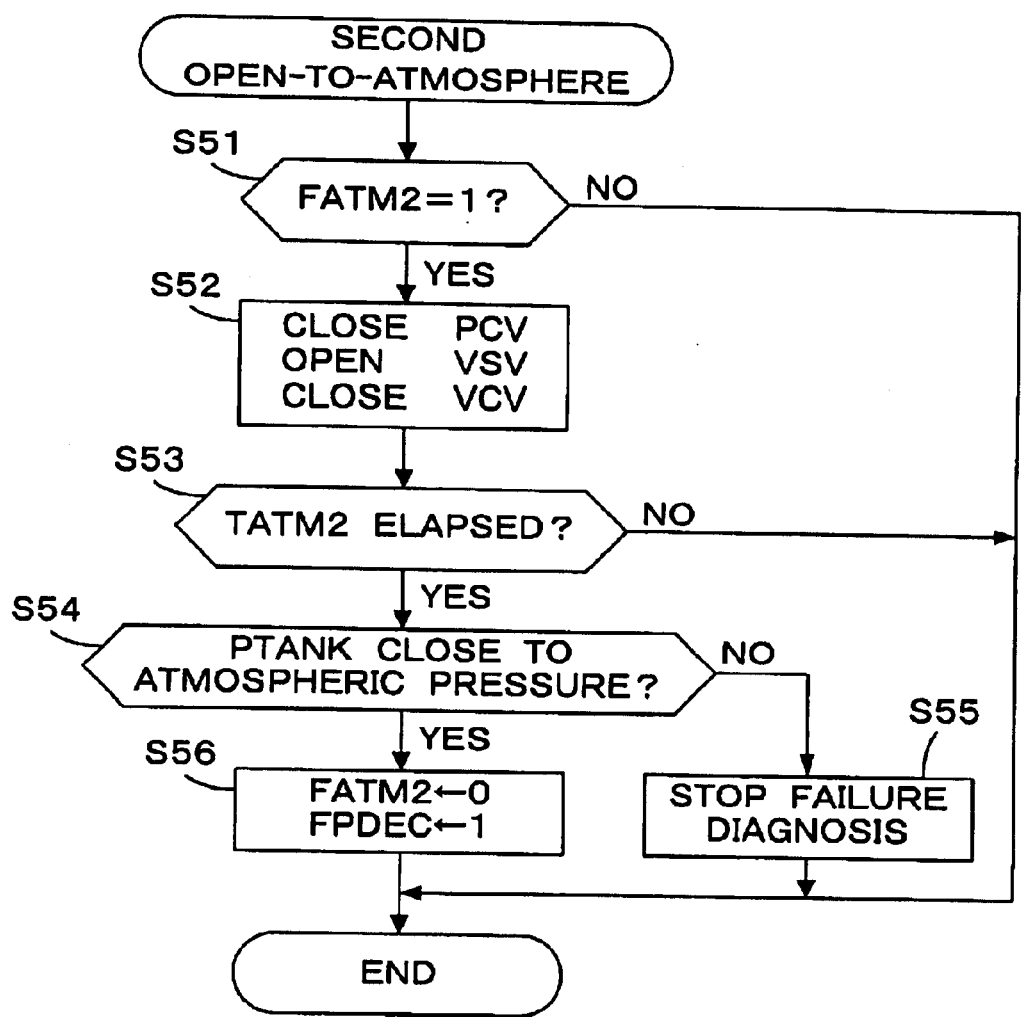
FIG. 6 is a flow chart of a second open-to-atmosphere mode process executed in the process of FIG. 3.

FIG. 6 is a flow chart of the second open-to-atmosphere mode process executed in step S16 of FIG. 3.

In step S51, it is determined whether or not the second open-to-atmosphere flag FATM2 is "1". If FATM2 is equal to "1", then the purge control valve 34 and the negative pressure control valve 45 are maintained in the closed state, while the vent shut valve 38 is opened (step S52). Then, it is determined whether or not a predetermined time period TATM2 (for example, 60 seconds) has elapsed after the time of opening the vent shut valve 38 (step S53). Before the predetermined time period TATM2 has elapsed, the present process ends immediately.

After the predetermined time period TATM2 has elapsed, it is determined whether or not the tank pressure PTANK is close to the atmospheric pressure PATM (step S54). If the answer to step S54 is negative (NO), then the failure diagnosis process is stopped (step S55). If the answer to step S54 is affirmative (YES), then the second open-to-atmosphere flag FATM2 is set to "0" and the decompression flag FPDEC is set to "1" (step S56). After execution of step S56, the answer to step S51 becomes negative, and the second open-to-atmosphere mode process ends.

Figure 7:
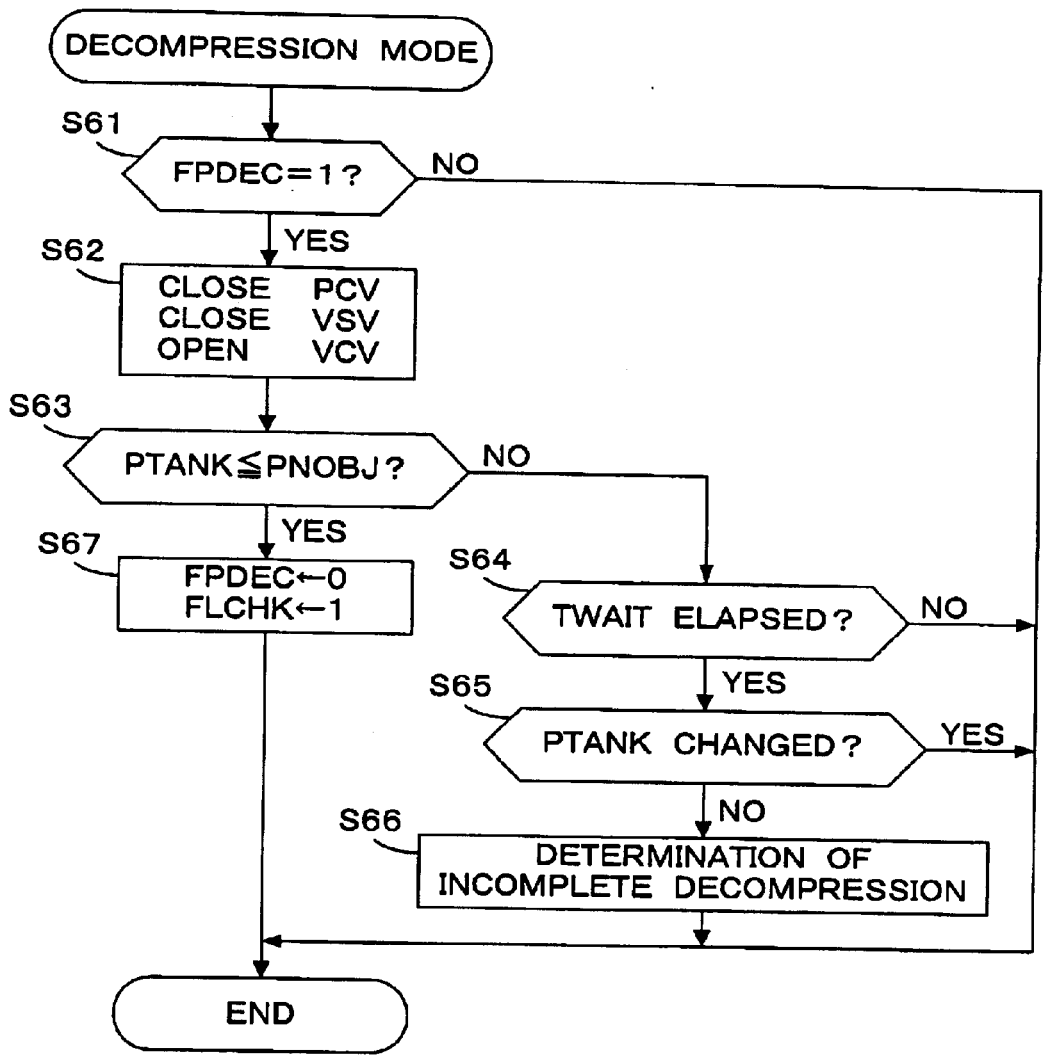
FIG. 7 is a flow chart of a decompression mode process executed in the process of FIG. 3.

FIG. 7 is a flow chart of the decompression mode process executed in step S17 of FIG. 3.

In step S61, it is determined whether or not the decompression flag FPDEC is "1". If FPDEC is equal to "1", then the purge control valve 34 is maintained in the closed state, while the vent shut valve 38 is closed and the negative pressure control valve 45 is opened (step S62). Consequently, the negative pressure reserved in the negative pressure reservoir 41 is introduced into the evaporative fuel processing system 50.

In step S63, it is determined whether or not the tank pressure PTANK is equal to or lower than the target pressure PNOBJ. Since PTANK is higher than PNOBJ initially, the process proceeds to step S64, in which it is determined whether or not predetermined time period TWAIT (for example, 60 seconds) has elapsed from the time the introduction of the negative pressure is started. Before the predetermined time period TWAIT has elapsed, the present process ends immediately. After the predetermined time period TWAIT has elapsed, the process proceeds to step S65, in which it is determined whether or not the tank pressure PTANK has changed (dropped) by more than a predetermined change amount ΔPDEC (for example, 1.3 kPa). If the answer to step S65 is negative (NO), indicating that the change amount of the tank pressure PTANK is little although the negative pressure is introduced, then it is determined that the decompression is incomplete and there is a leak in the negative pressure reservoir 41. Therefore, the failure diagnosis is stopped (step S66). If the answer to step S65 is affirmative (YES), then the present process ends immediately.

If PTANK is less than or equal to PNOBJ in step S63, then the decompression flag FPDEC is set to "0" and the leak check flag FLCHK is set to "1" (step S67). After execution of step S67, the answer to step S61 becomes negative, and the decompression mode ends.

Figure 8:
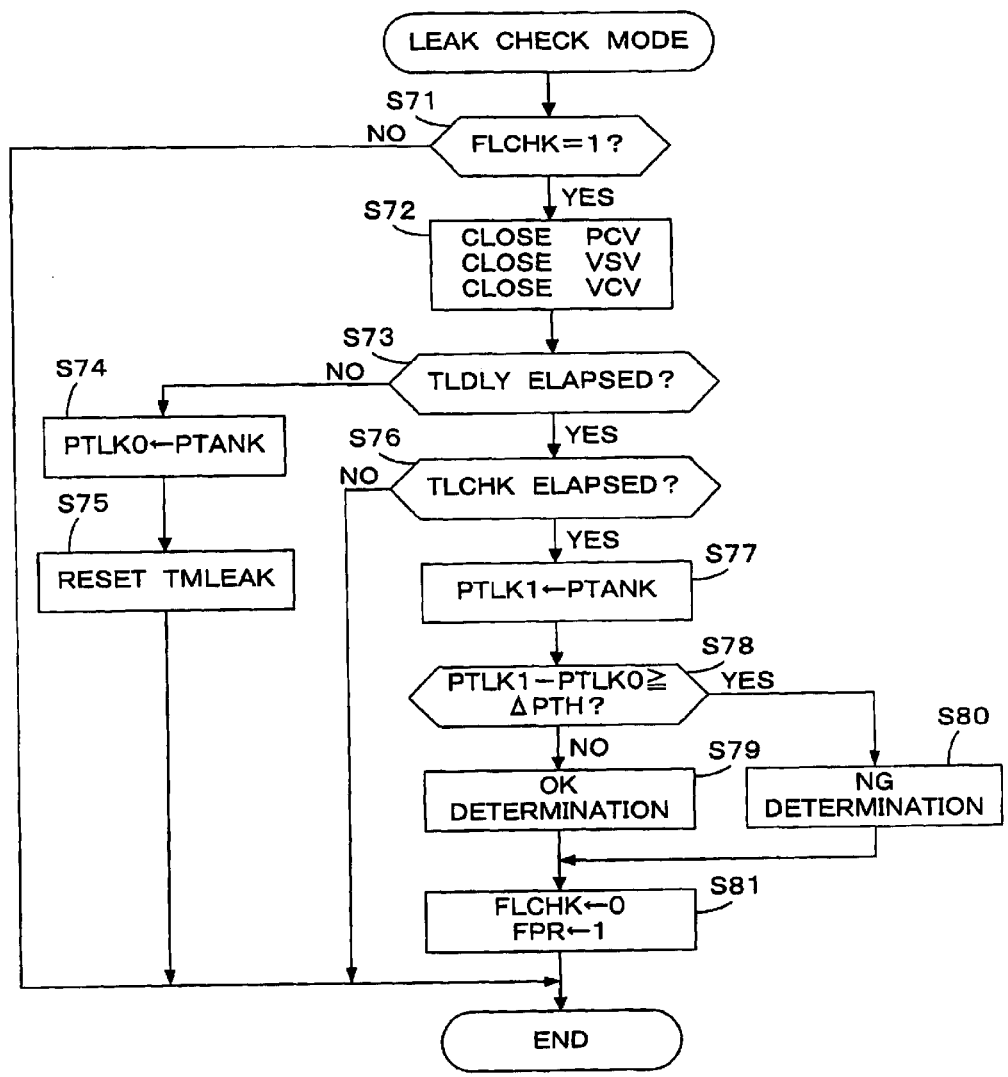
FIG. 8 is a flow chart of a leak check mode process executed in the process of FIG. 3.

FIG. 8 is a flow chart of the leak check mode process executed in step S18 of FIG. 3.

In step S71, it is determined whether or not the leak check flag FLCHK is "1". If FLCHK is equal to "1", then the purge control valve 34 and the vent shut valve 38 are maintained in the closed state, while the negative pressure control valve 45 is closed (step S72). Next, it is determined whether or not predetermined time period TLDLY (for example, 1 second) has elapsed from the time of closing the negative pressure control valve 45 (step S73). Before the predetermined time period TLDLY has elapsed, a starting pressure PTLK0 is set to the present tank pressure PTANK (step S74). Further, a leak check timer TMLEAK for measuring a waiting time period for a leak check is reset (step S75).

After the predetermined time period TLDLY has elapsed, the process proceeds from step S73 to step S76, in which it is determined whether or not the measured time period of the leak check timer TMLEAK reaches a predetermined time period TLCHK (for example, 120 seconds). If the answer to step S76 is negative (NO), the present process ends immediately. When the answer to step S76 becomes affirmative (YES), the process proceeds to step S77, in which an ending pressure PTLK1 is set to the present tank pressure PTANK. Next, it is determined whether or not a pressure difference between the ending pressure PTLK1 and the starting pressure PTLK0 is equal to or greater than a predetermined determination pressure ΔPTH (for example, 1.3 kPa) (step S78). If the answer to step S78 is affirmative (YES), indicating that the pressure change is great, then it is determined that there is a leak (step S80). On the other hand, if the pressure difference (PTLK1−PTLK0) is less than ΔPTH, indicating that the pressure change is little, it is determined that the evaporative fuel processing system 50 is normal (step S79).

In step S81, the leak check flag FLCHK is set to "0" and the pressure return flag FPR is set to "1". After execution of step S81, the answer to step S71 becomes negative (NO), and the leak check mode process ends.

Figure 9:
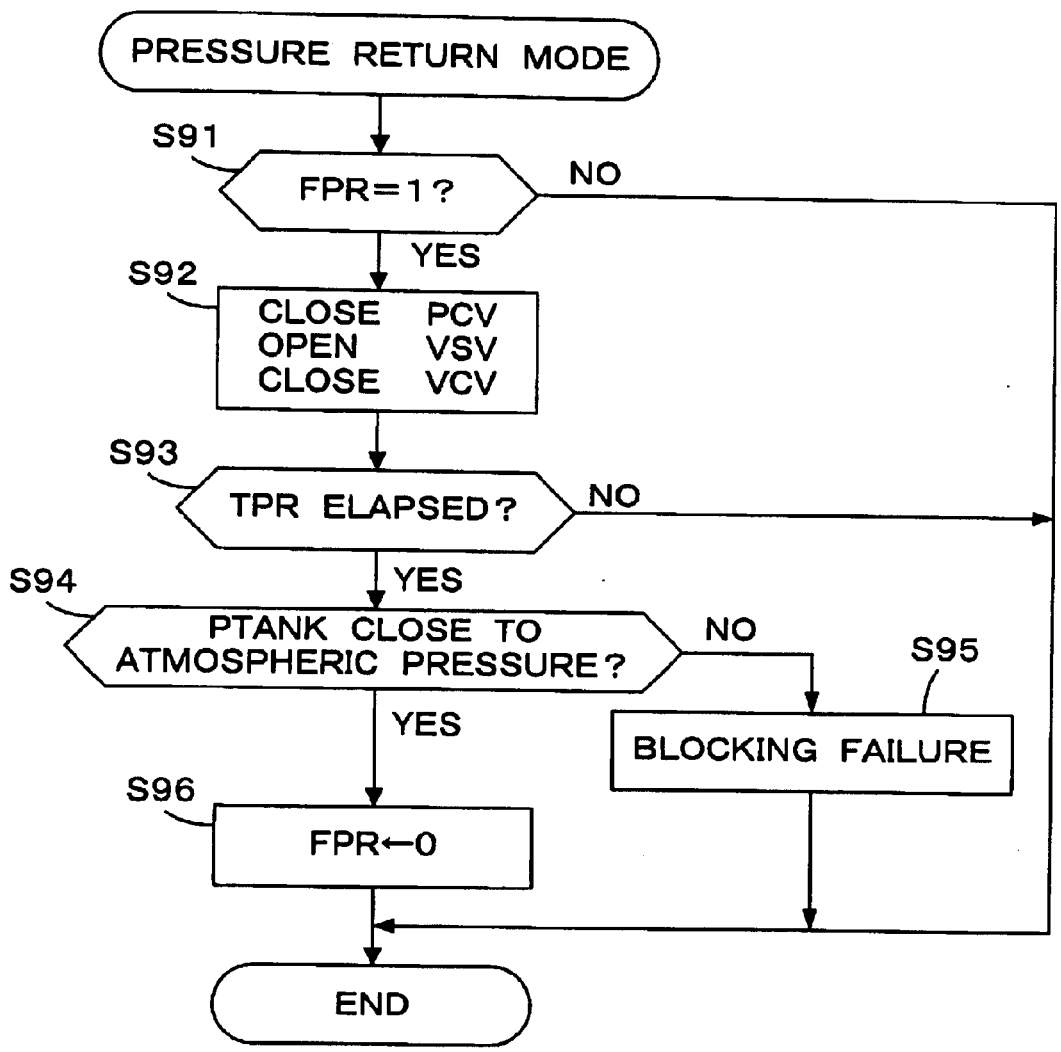
FIG. 9 is a flow chart of a pressure return mode process executed in the process of FIG. 3.

FIG. 9 is a flow chart of the pressure return mode process executed in step S19 of FIG. 3.

In step S91, it is determined whether or not the pressure return flag FPR is "1". If FPR is equal to "1", then the purge control valve 34 and the negative pressure control valve 45 is maintained in the closed state, while the vent shut valve 38 is opened (specifically, the control signal for opening the vent shut valve 38 is output) (step S92). Next, it is determined whether or not predetermined time period TPR (for example, 10 seconds) has elapsed from the time of opening the vent shut valve 38 (step S93). Before the predetermined time period TPR has elapsed, the present process ends immediately. After the predetermined time period TPR has elapsed, the process proceeds to step S94, in which it is determined whether or not the tank pressure PTANK returns to a value close to the atmospheric pressure. If the answer to step S94 is negative (NO), this indicates that the tank pressure PTANK does not return to the atmospheric pressure although the control signal for opening the vent shut valve 38 has been output in step S92. Therefore, it is determined that a failure (blocking failure) that the vent shut valve 38 does not open has occurred (step S95), and the failure diagnosis process ends. On the other hand, if the answer to step S94 is affirmative (YES), then the pressure return flag FPR is set to "0" (step S96). Consequently, the answer to step S91 becomes negative (NO), and the pressure return mode ends.

As described above in detail, in the present embodiment, the negative pressure reservoir 41 is provided for reserving the negative pressure in the intake pipe 2 during operation of the engine 1, and after stoppage of the engine 1, the negative pressure reserved in the negative pressure reservoir 41 is introduced into the evaporative fuel processing system 50. A failure of the evaporative fuel processing system 50 is determined based on the changes in the tank pressure PTANK after introduction of the negative pressure. Therefore, it is not necessary to use a motor pump for pressurization as in the conventional apparatus. Further, since the pressure in the evaporative fuel processing system 50 becomes lower than the atmospheric pressure, evaporative fuel can be prevented from being emitted to the atmosphere. Furthermore, the determination can be performed more rapidly compared with another determination method wherein the determination is performed based on changes in the tank pressure PTANK without using the negative pressure reservoir 41.

In the present embodiment, by way of example, the pressure sensor 15 and the negative pressure reservoir 41 correspond respectively to the pressure detecting means and the negative pressure storage means. The ECU 5 constitutes the engine stop detecting means, the negative pressure introducing means, and the determination means. More specifically, step S11 in FIG. 3 corresponds to the engine stop detecting means, step S17 in FIG. 3 corresponds to the negative pressure introducing means, and steps S18 and S19 in FIG. 3 correspond to the determination means.

Second Embodiment

In the present embodiment, the determination of whether there is a leak is performed focusing on the change amount (hereinafter referred to as "pressure change amount") DP of the tank pressure PTANK per predetermined time period (for example, 1 second) in the leak check mode process. As shown in FIG. 2, when there is no leak, the tank pressure PTANK in the leak check mode rises substantially linearly with a small inclination (rate of increase). Therefore, the pressure change amount DP takes a value which is low and substantially constant.

In contrast, when there is a leak, changes in the tank pressure PTANK show a tendency that the tank pressure PTANK initially increases with a comparatively great inclination and the inclination gradually decreases. Accordingly, the pressure change amount DP decreases gradually.

FIGS. 10A and 10B are time charts showing changes in actually measured values of the pressure change amount DP in the leak check mode. FIG. 10A corresponds to a case where there is no leak, while FIG. 10B corresponds to another case where there is a leak. Actually measured values of the pressure change amount DP distribute within a range indicated with hatching in FIGS. 10A and 10B. Therefore, if the actually measured values are used to determine a regression line by the method of least squares, a straight line L1 is obtained when there is no leak in the evaporative fuel processing system 50, while another straight line L2 is obtained when there is a leak. Accordingly, in the present embodiment, when an absolute value of the inclination A of a regression line determined from measured values of the pressure change amount DP, is lower than a determination threshold value ATH, it is determined that the evaporative fuel processing system 50 is normal. On the other hand, when the absolute value of the inclination A is greater than the determination value ATH, it is determined that there is a leak in the evaporative fuel processing system 50.

A failure diagnosis process in the present embodiment is hereinafter described more specifically. The second embodiment is similar to the first embodiment except the differences described below.

In the present embodiment, when the ignition switch is turned off and the engine 1 stops, operation of the ECU 5 is stopped. After a predetermined waiting time period TDLY2 (for example, one hour) has elapsed, the ECU 5 is started. FIG. 11 shows a flow chart illustrating this procedure. In step S101, it is determined by a engine stop timer TMSTP provided separately from the ECU 5 whether or not the predetermined waiting time period TDLY2 has elapsed from the stoppage of the engine 1. The engine stop timer TMSTP is an upcount timer which is started when the ignition switch is turned off.

After the predetermined waiting time period TDLY2 has elapsed from the engine stoppage, the ECU 5 is started by the engine stop timer TMSTP (step S102).

Figure 12:
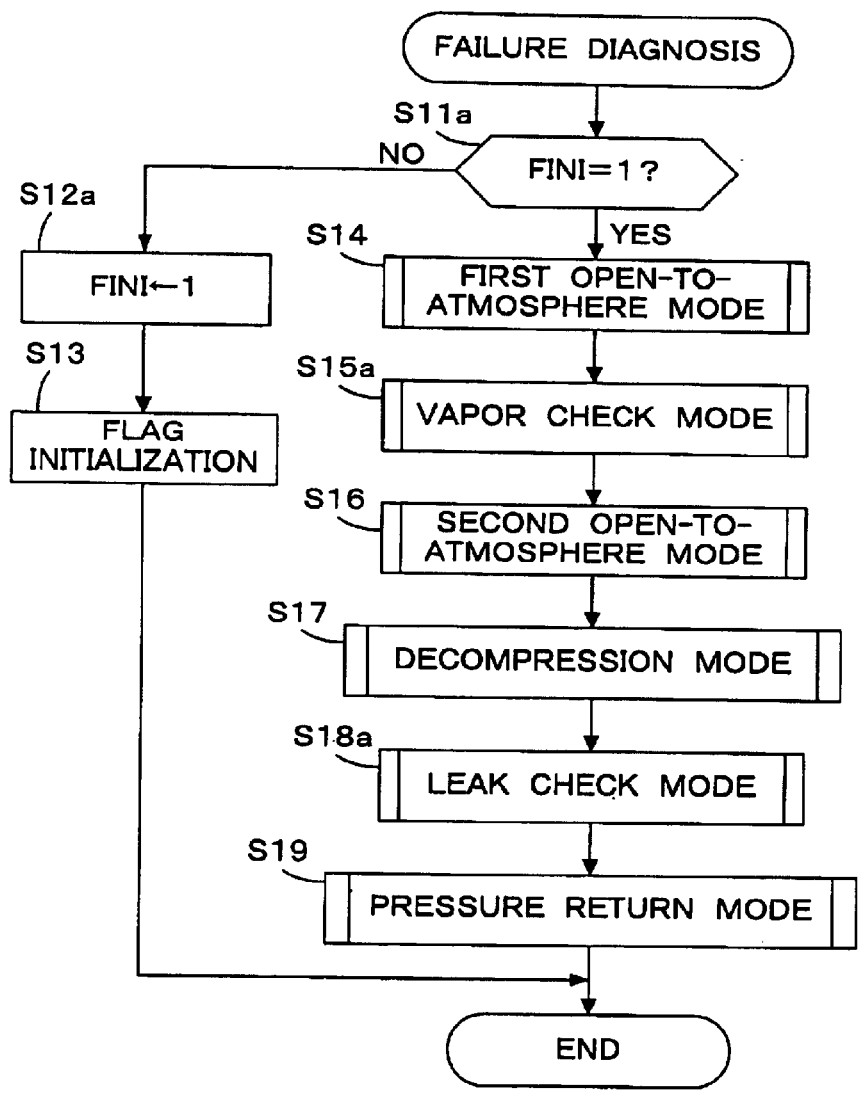
FIG. 12 is a flow chart of a process from performing a failure diagnosis.

FIG. 12 is a flow chart of the failure diagnosis process executed by the CPU in the started ECU 5. The process is executed at predetermined time intervals. The process of FIG. 12 is obtained by replacing steps S11, S12, S15 and S18 of FIG. 3 with steps S11a, S12a, S15a and S18a, respectively.

In step S11a, it is determined whether or not an initialization flag FINI is "1". Since FINI is equal to "0" initially, the process proceeds to step S12a, in which the initialization flag FINI is set to "1". Thereafter, the process proceeds to step S13. After the initialization flag FINI is set to "1", the process proceeds from step S11a to step S14 and the following steps. That is, a process similar to the process corresponding to steps S14 to S19 of FIG. 3 is executed. It is to be noted, however, that the vapor check mode process (step S15a) and the leak check mode process (step S18a) are different from the corresponding steps S15 and S18 of the first embodiment. Therefore, these processes of steps S15a and S18a will be described below.

Figure 13:
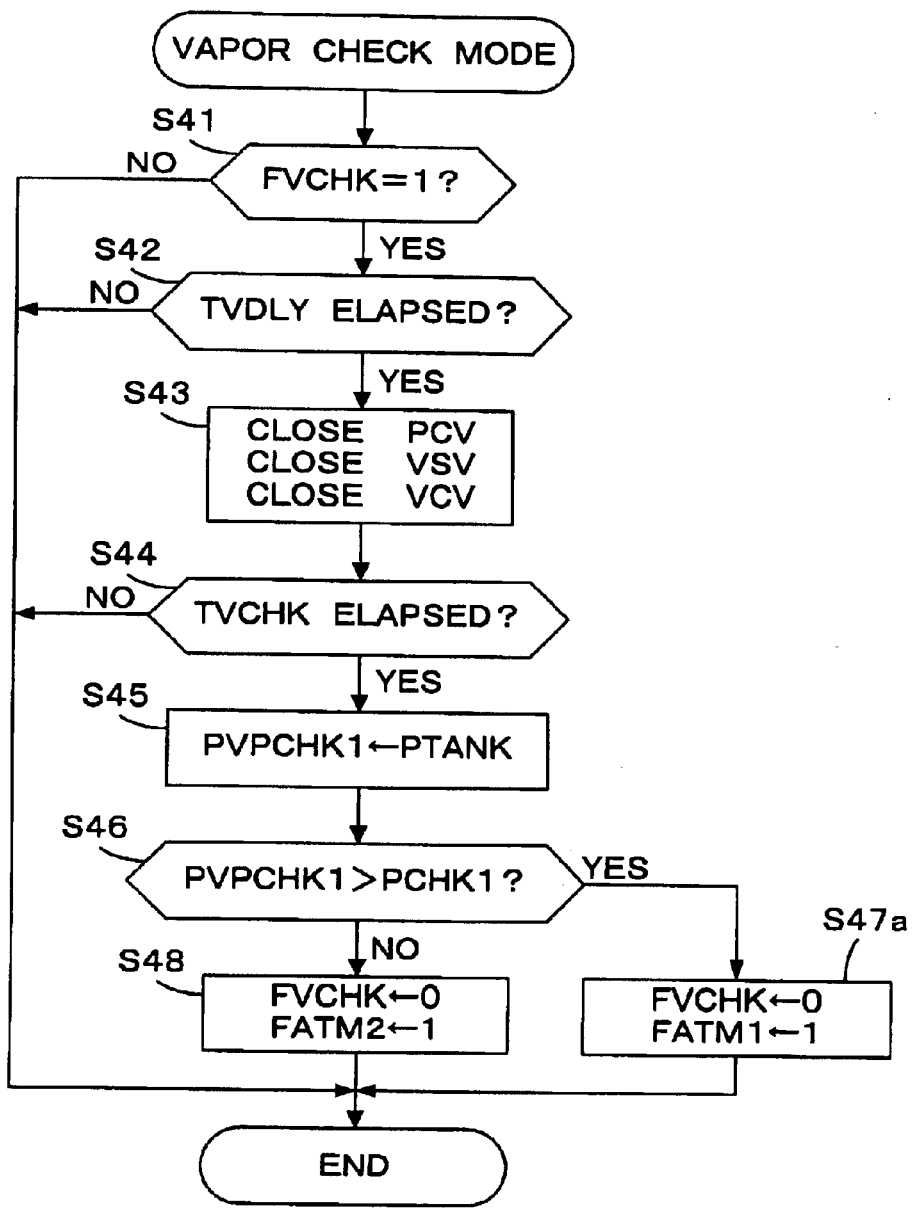
FIG. 13 is a flow chart of a vapor check mode process executed in the process of FIG. 12.

FIG. 13 is a flow chart of the vapor check mode process executed in step S15a of FIG. 12. In this process, step S47 of the process of FIG. 5 is changed to step S47a. Specifically, when the vapor check pressure PVPCHK1 is higher than the predetermined pressure PCHK1 in step S46, the generated amount of evaporative fuel is considered to be great. Therefore, the vapor check flag FVCHK is returned to "0" and the first open-to-atmosphere flag FATM1 is set to "1" again in step S47a, to execute the first open-to-atmosphere process again.

Consequently, the first open-to-atmosphere mode process is executed again. Thereafter, the vapor check mode process is executed again. As a result, when the answer to step S46 becomes negative (NO), the second open-to-atmosphere flag FATM2 is set to "1" (step S48), and the vapor check mode process ends.

Figure 14:
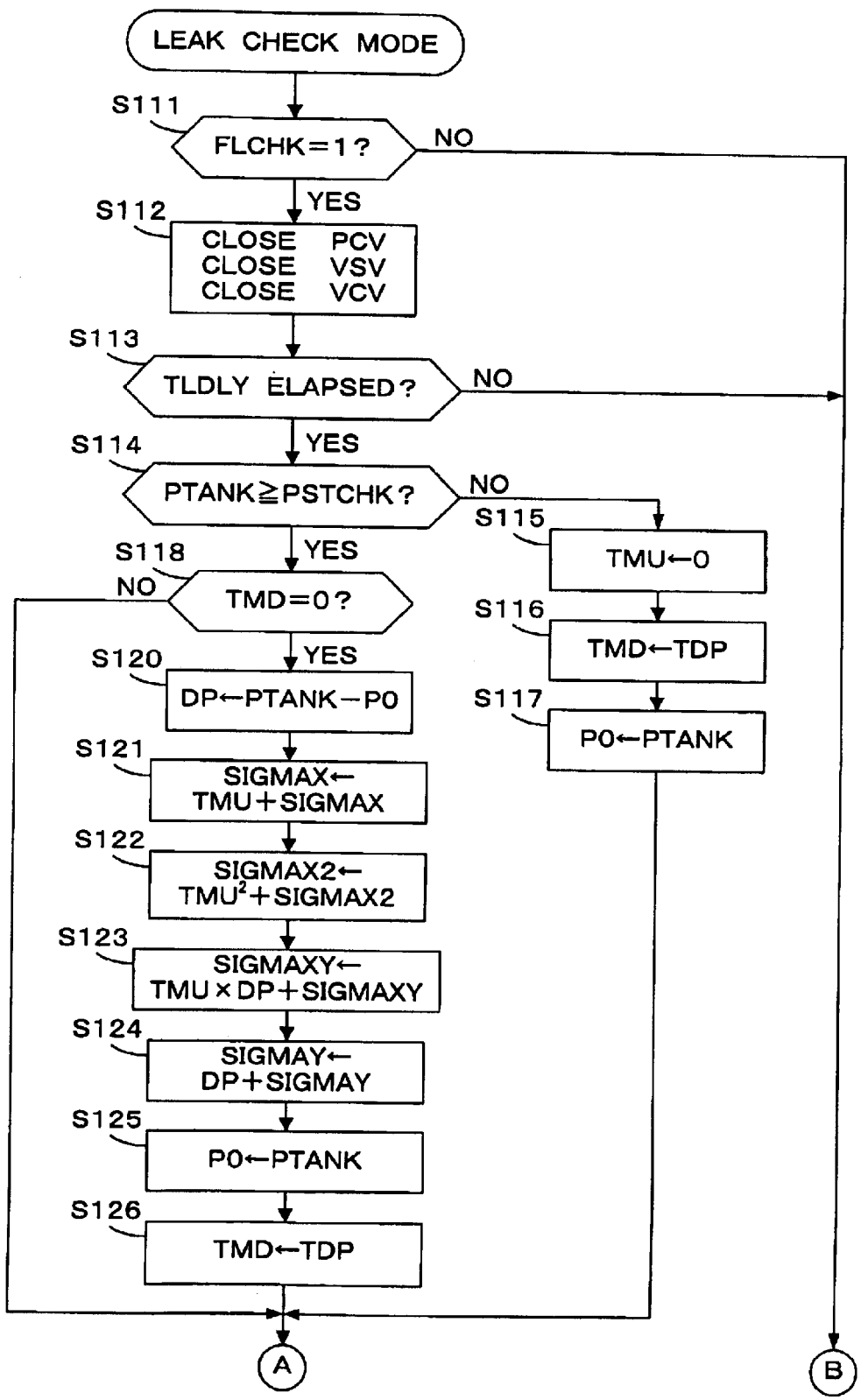
FIG. 14 is a flow chart of a leak check mode process executed in the process of FIG. 12.
Figure 15:
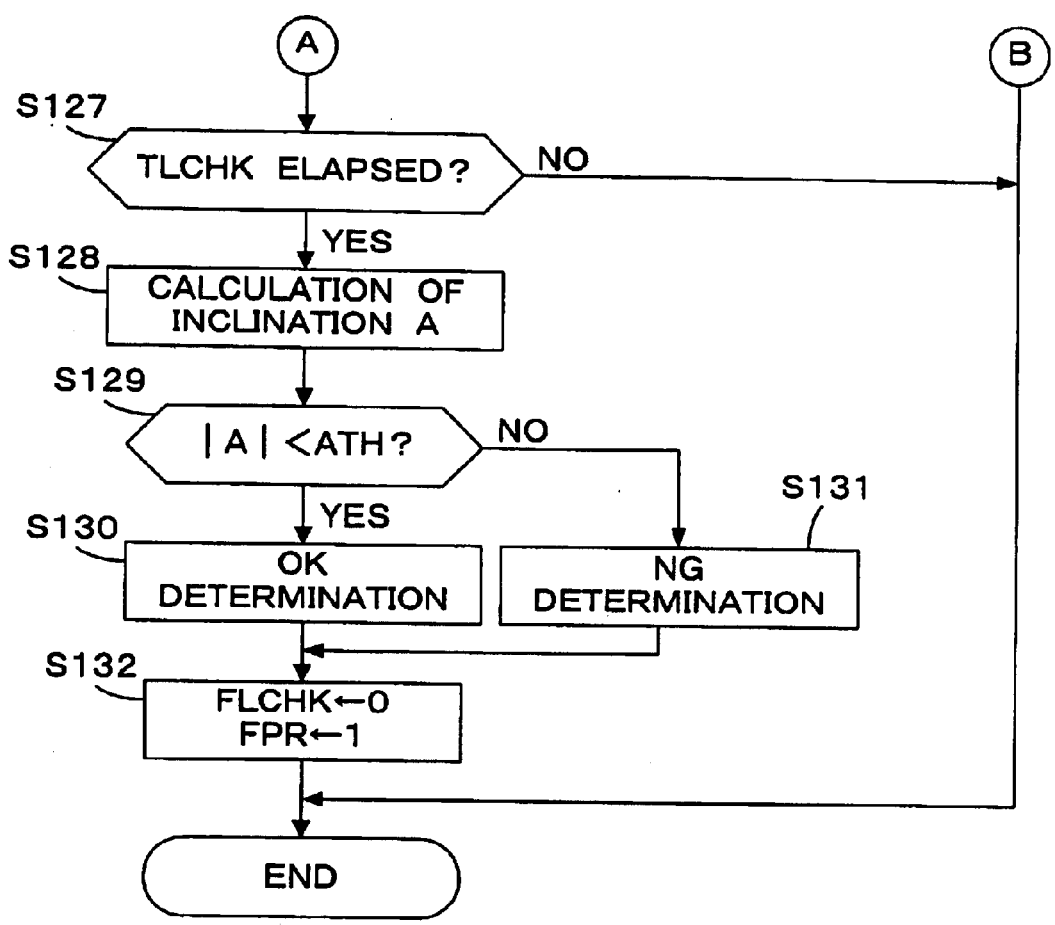
FIG. 15 is a flow chart of the leak check mode executed in the process of FIG. 12.

FIGS. 14 and 15 are flow charts of the leak check mode process executed in step S18a of FIG. 12.

Figure 16:
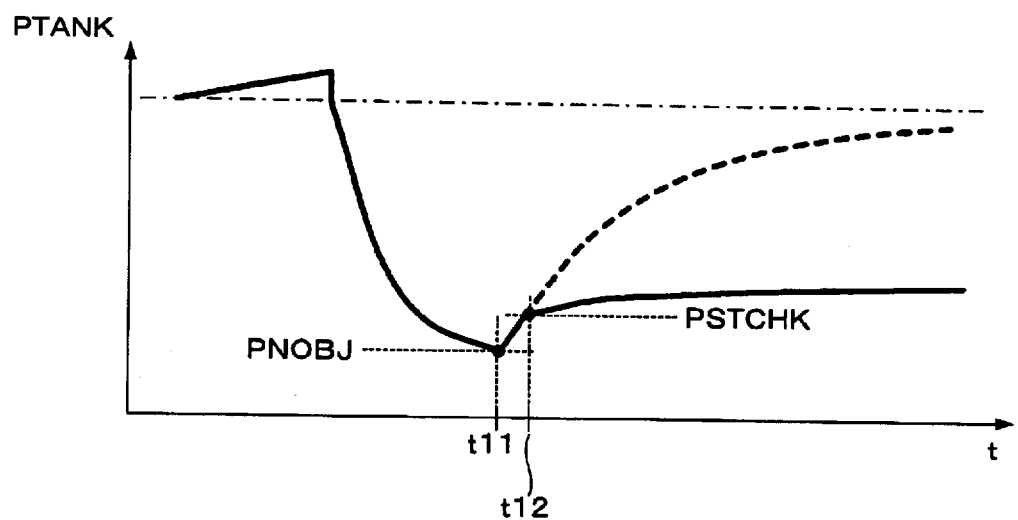
FIG. 16 is a time chart illustrating a start timing of the leak check.

In the present process, as shown in FIG. 16, a leak check is started at the time the tank pressure PTANK reaches a leak check starting pressure PSTCHK after the negative pressure control valve 45 is closed (time t11). This is because the following point is taken into consideration. That is, when the fuel tank is made of a resin, the shape of the fuel tank changes (contracts) as a result of the decompression. Therefore, the tank pressure PTANK rises a little immediately after the end of the decompression (closing of the negative pressure control valve 45). The target pressure PNOBJ is set to, for example, (atmospheric pressure PATM—2.5 kPa (18.5 mmHg)), and the leak check starting pressure PSTCHK is set to approximately (PATM—2.0 kPa (15 mmHg)).

In step S111 of FIG. 14, it is determined whether or not the leak check flag FLCHK is "1". If FLCHK is equal to "1", then the purge control valve 34 and the vent shut valve 38 are maintained in the closed state, while the negative pressure control valve 45 is closed (step S112). Next, it is determined whether or not the predetermined time period TLDLY (for example, 1 second) has elapsed from the time the negative pressure control valve 45 is closed (step S113). Before the predetermined time period TLDLY has elapsed, the present process ends immediately.

After the predetermined time period TLDLY has elapsed, the process proceeds from step S113 to step S114, in which it is determined whether or not the tank pressure PTANK is equal to or higher than the leak check starting pressure PSTCHK. Since PTANK is lower than PSTCHK initially, the process proceeds to step S115, in which an upcount timer TMU is set to "0" and started, and a down count timer TMD is set to a predetermined time period TDP (for example, 1 second) and started (step S116). Next, an initial pressure P0 for calculating the pressure change amount DP is set to the present tank pressure PTANK (step S117). Thereafter the process proceeds to step S127.

After the tank pressure PTANK reaches the leak check starting pressure PSTCHK, the process proceeds from step S114 to step S118, in which it is determined whether or not the value of the downcount timer TMD is "0". Since TMD is greater than "0" initially, the process proceeds immediately to step S127. If TMD is equal to "0", then the process proceeds to step S120, in which the initial pressure P0 is subtracted from the present tank pressure PTANK to calculate a pressure change amount DP (PTANK−P0).

In step S121, an integrated value SIGMAX of the value of the upcount timer TMU is calculated in accordance with the following expression (1).

$$\text{SIGMAX} = TMU + \text{SIGMAX} \tag{1}$$

where SIGMAX on the right side is a value calculated in the preceding cycle.

In step S122, an integrated value SIGMAX2 of the square of the value of the upcount timer TMU is calculated in accordance with the following expression (2).

$$\text{SIGMAX2} = TMU^2 + \text{SIGMAX2} \tag{2}$$

where SIGMAX on the right side is a value calculated in the preceding cycle.

In step S123, an integrated value SIGMAXY of the product of the value of the upcount timer TMU and the pressure change amount DP is calculated in accordance with the following expression (3).

$$\text{SIGMAXY} = TMU \times DP + \text{SIGMAXY} \tag{3}$$

where SIGMAXY on the right side is a value calculated in the preceding cycle.

In step S124, an integrated value SIGMAY of the pressure change amount DP is calculated in accordance with the following expression (4).

$$\text{SIGMAY} = DP + \text{SIGMAY} \tag{4}$$

where SIGMAY on the right side is a value calculated in the preceding cycle.

In step S125, the initial pressure P0 is set to the present tank pressure PTANK. Then, the downcount timer TMD is set to the predetermined time period TDP and started (step S126). By means of steps S118 and S126, steps S120 to S126 are executed at intervals of the predetermined time period TDP. By executing steps S120 to S126 repeatedly, the integrated values SIGMAX, SIGMAX2, SIGMAXY and SIGMAY that are necessary for determining the inclination A of a regression line based on the detected values of the pressure change amount DP, are calculated. The regression line indicates a relation between the pressure change amount and the value of the upcount timer TMU.

In step S127, it is determined whether or not the value of the upcount timer TMU reaches the predetermined time period TLCHK. When TMU is less than TLCHK, the present process ends immediately. After the value of the upcount timer TMU reaches the predetermined time period TLCHK, the process proceeds to step S128, in which the integrated values SIGMAX, SIGMAX2, SIGMAXY and SIGMAY calculated in steps S121 to S124, are applied to the following expression (5) to calculate the inclination A of the regression line. The expression (5) is well known as an expression for determining the inclination of a regression line.

$$A = \frac{\text{SIGMAXY} - (\text{SIGMAX} \times \text{SIGMAY})/\text{NDATA}}{\text{SIGMAX2} - \text{SIGMAX}^2/\text{NDATA}} \tag{5}$$

where NDATA is a data number obtained by dividing the value of the up count timer TMU by the predetermined time period TDP.

In step S129, it is determined whether or not the absolute value of the inclination A is less than the determination value ATH. If |A| is less than ATH, then it is determined that the evaporative fuel processing system 50 is normal (step S130). On the other hand, if |A| is greater than or equal to ATH, then it is determined that there is a leak in the evaporative fuel processing system 50 (step S131). Next in step S132, the leak check flag FLCHK is returned to "0" and the pressure return flag FPR is set to "1". After execution of step S132, the answer to step S111 becomes negative (NO), and the leak check mode ends.

As described above, in the present embodiment, whether or not there is a leak is determined based on the inclination A of a changing characteristic of the pressure change amount DP in the leak check mode (based on a parameter corresponding to a second-derivative value of the tank pressure PTANK). Consequently, the determination can be performed more accurately compared with the first embodiment. Further, by using a statistical method that a regression line is determined from detected values of the pressure change amount DP, the influence of differences in the detected values can be reduced to improve accuracy of the determination.

In the present embodiment, for example, the engine stop timer TMSTP corresponds to the engine stop detecting means, and the process of FIG. 12 executed by the CPU in the ECU 5 corresponds to the determination means.

Figure 17:
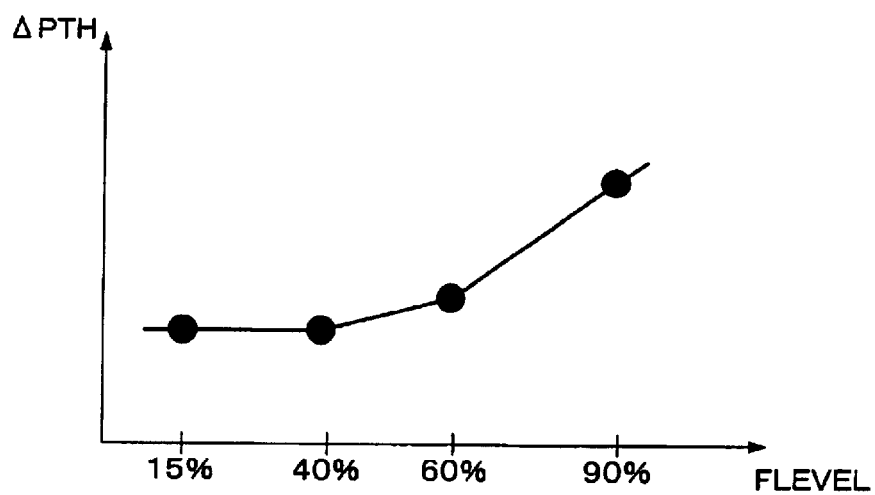
FIG. 17 is a graph showing setting of a determination threshold value ($\Delta$PTH) according to a fuel level (FLEVEL).

It is to be noted that the present invention is not limited to the embodiments described above but various modifications may be made. In the first embodiment described above, the predetermined determination pressure ΔPTH used in step S78 of FIG. 8 is a predetermined fixed value. Alternatively, the determination pressure ΔPTH may be set according to a remaining fuel amount FLEVEL (%) in the fuel tank 9, as shown FIG. 17. In this modification, it is preferable that the determination pressure ΔPTH is set so that the determination pressure ΔPTH increases as the remaining fuel amount FLEVEL increases. This makes it possible to perform accurate determination irrespective of the remaining fuel amount in the fuel tank.

Further, in the embodiments described above, the pressure sensor 15 is disposed in the fuel tank 9. The location of the pressure sensor 15 is not limited to this. Alternatively, the pressure sensor 15 may be disposed, for example, in the charge passage 31 or the canister 33.

Furthermore, the present invention can be applied also to a failure diagnosis of an evaporative fuel processing system including a fuel tank for supplying fuel to a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A failure diagnosis apparatus for diagnosing a failure of an evaporative fuel processing system which includes a fuel tank, a canister having adsorbent for adsorbing evaporative fuel generated in said fuel tank, an air passage connected to said canister and communicating said canister with the atmosphere, a first passage for connecting said canister and said fuel tank, a second passage for connecting said canister and an intake system of an internal combustion engine, a vent shut valve for opening and closing said air passage, and a purge control valve provided in said second passage, said failure diagnosis apparatus comprising:

pressure detecting means for detecting a pressure in said evaporative fuel processing system;

negative pressure reserving means for reserving negative pressure in said intake system during operation of said engine;

engine stoppage detecting means for detecting stoppage of said engine;

negative pressure introducing means for closing said purge control valve and said vent shut valve to introduce the negative pressure reserved in said negative pressure reserving means into said evaporative fuel processing system, when stoppage of said engine is detected by said engine stoppage detecting means; and determining means for determining whether or not there is a leak in said evaporative fuel processing system, based on the pressure detected by said pressure detecting means during a predetermined determination period after the negative pressure is introduced into said evaporative fuel processing system.

2. The failure diagnosis apparatus according to claim 1, wherein said determining means determines that there is a leak in said evaporative fuel processing system, when an amount of change in the pressure detected by said pressure detecting means during the predetermined determination period, is greater than a determination threshold value.

3. The failure diagnosis apparatus according to claim 2, further comprising fuel amount detecting means for detecting a remaining fuel amount in said fuel tank, wherein the determination threshold value is set according to the remaining fuel amount detected by said fuel amount detecting means.

4. The failure diagnosis apparatus according to claim 1, wherein said determination means calculates a change rate parameter indicative of a rate of change in the pressure detected by said pressure detecting means during the predetermined determination period, and performs the determination based on a rate of change in the change rate parameter.

5. The failure diagnosis apparatus according to claim 4, wherein said determination means statistically processes detected values of the change rate parameter and detection timings of the detected values of the change rate parameter, to calculate an inclination of a regression line indicative of a relation between the detected values of the change rate parameter and the detection timings thereof, and performs the determination based on the calculated inclination.

6. A failure diagnosis method for diagnosing a failure of an evaporative fuel processing system which includes a fuel tank, a canister having adsorbent for adsorbing evaporative fuel generated in said fuel tank, an air passage connected to said canister and communicating said canister with the atmosphere, a first passage for connecting said canister and said fuel tank, a second passage for connecting said canister and an intake system of an internal combustion engine, a vent shut valve for opening and closing said air passage, and a purge control valve provided in said second passage, said failure diagnosis method comprising the steps of:

a) reserving negative pressure in said intake system during operation of said engine;

b) detecting stoppage of said engine;

c) closing said purge control valve and said vent shut valve to introduce the reserved negative pressure into said evaporative fuel processing system, when stoppage of said engine is detected;

d) detecting a pressure in said evaporative fuel processing system; and e) determining whether or not there is a leak in said evaporative fuel processing system, based on the detected pressure during a predetermined determination period after the negative pressure is introduced into said evaporative fuel processing system.

7. The failure diagnosis method according to claim 6, wherein it is determined that there is a leak in said evaporative fuel processing system, when an amount of change in the detected pressure during the predetermined determination period, is greater than a determination threshold value.

8. The failure diagnosis method according to claim 7, further comprising the step of detecting a remaining fuel amount in said fuel tank, wherein the determination threshold value is set according to the detected remaining fuel amount.

9. The failure diagnosis method according to claim 6, wherein a change rate parameter indicative of a rate of change in the pressure detected during the predetermined determination period is calculated, and the determination is performed based on a rate of change in the change rate parameter.

10. The failure diagnosis method according to claim 9, wherein detected values of the change rate parameter and detection timings of the detected values of the change rate parameter are statistically processed, to calculate an inclination of a regression line indicative of a relation between the detected values of the change rate parameter and the detection timings thereof, and the determination is performed based on the calculated inclination.

11. A computer program for causing a computer to carry out a failure diagnosis method for diagnosing a failure of an evaporative fuel processing system which includes a fuel tank, a canister having adsorbent for adsorbing evaporative fuel generated in said fuel tank, an air passage connected to said canister and communicating said canister with the atmosphere, a first passage for connecting said canister and said fuel tank, a second passage for connecting said canister and an intake system of an internal combustion engine, a vent shut valve for opening and closing said air passage, and a purge control valve provided in said second passage, said failure diagnosis method comprising the steps of:

a) reserving negative pressure in said intake system during operation of said engine;

b) detecting stoppage of said engine;

c) closing said purge control valve and said vent shut valve to introduce the reserved negative pressure into said evaporative fuel processing system, when stoppage of said engine is detected;

d) detecting a pressure in said evaporative fuel processing system; and e) determining whether or not there is a leak in said evaporative fuel processing system, based on the detected pressure during a predetermined determination period after the negative pressure is introduced into said evaporative fuel processing system.

12. The computer program according to claim 11, wherein it is determined that there is a leak in said evaporative fuel processing system, when an amount of change in the detected pressure during the predetermined determination period, is greater than a determination threshold value.

13. The computer program according to claim 12, wherein the failure diagnosis method further comprises the step of detecting a remaining fuel amount in said fuel tank, and the determination threshold value is set according to the detected remaining fuel amount.

14. The computer program according to claim 11, wherein a change rate parameter indicative of a rate of change in the pressure detected during the predetermined determination period is calculated, and the determination is performed based on a rate of change in the change rate parameter.

15. The computer program according to claim 14, wherein detected values of the change rate parameter and detection timings of the detected values of the change rate parameter are statistically processed, to calculate an inclination of a regression line indicative of a relation between the detected values of the change rate parameter and the detection timings thereof, and the determination is performed based on the calculated inclination.

* * * * *